US011912538B2

(12) United States Patent
Munoz Sotoca et al.

(10) Patent No.: US 11,912,538 B2
(45) Date of Patent: Feb. 27, 2024

(54) DOUBLE IMPACT AREA BUFFER FOR IMPROVED PLANK

(71) Applicant: Otis Elevator Company, Farmington, CT (US)

(72) Inventors: Javier Munoz Sotoca, Madrid (ES); Luis Mena, Madrid (ES)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/846,836

(22) Filed: Jun. 22, 2022

(65) Prior Publication Data

US 2023/0202799 A1 Jun. 29, 2023

(51) Int. Cl.
*B66B 5/28* (2006.01)
*B66B 11/02* (2006.01)

(52) U.S. Cl.
CPC .............. *B66B 5/282* (2013.01); *B66B 5/284* (2013.01); *B66B 11/0273* (2013.01)

(58) Field of Classification Search
CPC ...... B66B 5/282; B66B 5/284; B66B 11/0273
See application file for complete search history.

(56) References Cited

U.S. PATENT DOCUMENTS

| | | | | |
|---|---|---|---|---|
| 8,807,288 | B1 * | 8/2014 | Rivera | B66B 13/245 187/400 |
| 2003/0217895 | A1 | 11/2003 | Kigawa et al. | |
| 2004/0251087 | A1 | 12/2004 | Huber et al. | |

FOREIGN PATENT DOCUMENTS

| | | | | |
|---|---|---|---|---|
| CN | 106395549 | A * | 2/2017 | B66B 5/00 |
| CN | 108946381 | A | 12/2018 | |
| CN | 110862000 | A | 3/2020 | |
| CN | 210286378 | U | 4/2020 | |
| CN | 114955795 | A * | 8/2022 | |
| EP | 3901080 | A1 * | 10/2021 | B66B 11/0226 |
| JP | 2001163543 | A * | 6/2001 | |
| JP | 2001226053 | A * | 8/2001 | |
| JP | 2014084227 | A * | 5/2014 | |
| KR | 100878746 | B1 * | 1/2009 | |
| WO | WO-2006033135 | A1 * | 3/2006 | B66B 5/282 |
| WO | 2016096827 | A1 | 6/2016 | |

OTHER PUBLICATIONS

Machine Translation of KR 100878746.*
Machine Translation of CN 106395549.*
European Search Report for application EP 21383217.3, dated Jun. 27, 2022, 88 pages.

* cited by examiner

*Primary Examiner* — Diem M Tran
(74) *Attorney, Agent, or Firm* — CANTOR COLBURN LLP

(57) ABSTRACT

A buffer device (121) for an elevator system (100), the buffer device (121) including a first contact structure (501) and a second contact structure (503). The first contact structure (501) includes a first contact surface (505), and the second contact structure (503) includes a second contact surface (507). The first contact surface (505) and the second contact surface (507) are arranged for contacting respective vertically offset surfaces of an elevator car (101) or counterweight (109).

14 Claims, 6 Drawing Sheets

DOUBLE IMPACT AREA BUFFER FOR IMPROVED PLANK

FOREIGN PRIORITY

This application claims priority to European Patent Application No. 21383217.3, filed Dec. 24, 2021, and all the benefits accruing therefrom under 35 U.S.C. § 119, the contents of which in its entirety are herein incorporated by reference.

TECHNICAL FIELD

This disclosure generally relates to elevator system buffer devices for safely decelerating an elevator car close to the bottom of a hoistway in the event that the machine brake or car safeties fail to arrest the motion of an elevator car within the hoistway.

BACKGROUND OF THE DISCLOSURE

It is known to provide buffer devices within the pit of an elevator hoistway to help safely arrest the motion of a descending elevator car in the event that one or more braking devices fail to operate as intended. Typically, such buffer devices are located on the floor of the elevator pit, and provide a raised area that can be impacted by a "buffer strike" component of an elevator car during a "buffer strike" event in the event that the elevator car descends too far within the hoistway. Buffer devices are typically compressible, and are arranged to decelerate the elevator car by absorbing a portion of the impact force of the elevator car as it approaches the bottom of the hoistway.

When the buffer strike of the elevator car impacts the buffer device(s) in the hoistway, a significant amount of stress is introduced into areas of the buffer strike surface of the elevator car around the area of its impact with the buffer devices. This may lead to damage of the buffer strike component, and necessitates certain material requirements of that component, such as a minimum thickness or a maximum acceptable deformation of the buffer strike component in response to an impact with the buffer devices.

It will be appreciated that the same issues arise in relation to counterweights which also have buffer devices arranged below them for contact with counterweight buffer strike components.

The present disclosure seeks to address this issue.

SUMMARY

According to a first aspect of this disclosure, there is provided a buffer device for an elevator system, the buffer device comprising: a first contact structure and a second contact structure; wherein the first contact structure comprises a first contact surface; wherein the second contact structure comprises a second contact surface; wherein the first contact surface and the second contact surface are arranged for contacting respective vertically offset surfaces of an elevator car or counterweight.

In accordance with this disclosure, there is provided a buffer device having first and second contact surfaces, arranged for contacting respective vertically offset surfaces of an elevator car or counterweight. Using a buffer device having two distinct contact surfaces which impact different surfaces of the elevator car or counterweight better distributes the impact force between the buffer device and the elevator car or counterweight. This allows stress resulting from an impact between the buffer device and the elevator car or counterweight to be distributed more widely, resulting in lower stress and deformation of the impact surfaces of the elevator car or counterweight. In particular, the two impact surfaces (buffer strike surfaces) of the car or counterweight may be on different components of the car or counterweight, thereby spreading the stress of the impact over separate components, each of which therefore has reduced material requirements and can be made smaller (e.g. thinner) and lighter.

The first and second contact surfaces of the buffer device may be vertically offset in order for them to contact the vertically offset surfaces of the elevator car or counterweight. Thus, in some examples, the second contact surface of the buffer device is vertically offset from the first contact surface of the buffer device by a first distance.

In some examples, the first contact structure and the second contact structure have different heights in order for them to contact the vertically offset surfaces of the elevator car or counterweight. The difference in height may be selected based on properties of an elevator car or counterweight with which the buffer device is arranged to operate. In some examples, the first contact structure has a first height, the second contact structure has a second height, and the difference between the first height and the second height is between 20 mm and 100 mm. In some examples, the difference between the first height and the second height may be between 40 mm and 70 mm. In some examples, the difference between the first height and the second height may be between 45 mm and 55 mm, for example 50 mm. However, it will be appreciated that in some examples, the difference between the first height and the second height may be greater than this. In one example, the difference between the first height and the second distance may be 49 mm. This may also be the first distance mentioned above. In some such examples, the first height may be greater than the second height.

In some examples, the first and second contact structures of the buffer device may be formed from the same material. They may be formed in a single manufacturing step from a common piece of material (such as a plastic or elastomer) or they may be formed separately. When formed separately, they may later be connected or joined together to form the buffer device. Forming the first and second contact structures from the same material may allow manufacturing costs of the buffer device to be reduced as well as ensuring a cohesive structure that can absorb the impact of a buffer strike event.

As the buffer device is designed to absorb impact from an elevator car or counterweight, it is advantageous for the buffer device to be formed from a deformable material to allow it to better absorb energy from a moving elevator car or counterweight. The first and/or second contact structures may be formed from a plastically deformable material, i.e. one that is designed to deform plastically upon impact. Such devices would need to be replaced or returned to their original state following a buffer strike event. Thus, in some examples, the first contact structure and/or the second contact structure are elastically deformable. Such structures can return to their original form automatically after a buffer strike event and after the car or counterweight has been lifted off the buffer device. In some examples, the first contact structure and/or the second contact structure comprises a compressible material. In some examples, the first contact structure and/or the second contact structure comprises a resilient material. In some such examples, the compressible material may be polymer-based. In some examples the compressible material may comprise polyurethane. In some examples, the compressible material may comprise polytetrafluoroethylene (PTFE). In some examples, the compressible material may comprise a polypropylene/butyl rubber blend, a polyvinylchloride/chlorinated polyethylene/epoxidized natural rubber blend, a polyimide/polyimide blend, a polysulfone/polysulfone blend, a nylon-6/polypropylene blend and/or a urethane/acrylate interpenetrating polymer network. The compressible material may be an elastomer and/or other amorphous thermoplastics that have a glass transition temperature below room temperature.

In some examples, the buffer device may be configured to contact vertically offset surfaces of an elevator car or counterweight that are substantially parallel, such as two planar regions on the underside of an elevator car or counterweight. To enable the buffer device to contact said offset surfaces as widely and evenly as possible, the first and second contact surfaces of the buffer device may have a profile that matches that of the contact surfaces of the elevator car or counterweight. Thus, in some examples, the second contact surface of the buffer device is substantially parallel to the first contact surface of the buffer device.

In some examples, the first contact surface may be formed above the second contact surface, and the second contact surface may have a greater area than the first contact surface. In some examples, the second contact surface substantially surrounds the first contact surface. In some such examples, the second contact surface and the first contact surface may be concentric. For example, they may be formed from similar shapes with a common centre point. For example, the first contact surface may be a circle and the second contact surface may be a circular ring surrounding the first contact surface and where the outer perimeters of the first and second contact surfaces are circles with centres that lie on a common axis perpendicular to the two contact surfaces. It will be appreciated that the same principles can be extended to other shapes, e.g., triangular, square, pentagonal, etc.

The first contact surface may have a first contact area and the second contact surface may have a second contact area. These contact areas are the areas that will make contact with the buffer strike surfaces of the elevator car or counterweight. The contact areas affect the load transfer during a buffer strike event. The contact areas are selected so that a buffer strike event will be sufficiently arrested by the buffer but that it will also cause sufficient compression of the buffer that the deceleration is minimised. The ratio of the first contact area to the second contact area will determine the distribution of load between the first and second buffer strike surfaces of the elevator car or counterweight. The ratio may be selected to put an equal load on each component or alternatively the ratio may be selected to provide more load on one of the components, i.e. an asymmetrical load distribution. In some examples the first contact surface is larger than the second contact surface. In some examples, the ratio of the first area to the second area is between 0.5 and 1.0. In some examples, the ratio of the first area to the second area may be between 0.6 and 0.8, for example 0.7. It will be appreciated that the ratio and areas may vary significantly depending on several factors, including for example the material of the buffer device and/or the size of the elevator car or counterweight.

In some examples, it may be desirable for the first contact structure and the second contact structure to have different material properties. For example, the first and second contact structures may be arranged to contact surfaces of an elevator car or counterweight having different hardness values. The properties of the first and second contact structures may thus be selected so as to reduce the potential for damage to the surfaces of the elevator car or counterweight having different properties. Thus, in some examples, the first contact structure is formed from a first material, and the second contact structure is formed from a second material. In some examples, one material may be harder than the other. In some examples, one material may be more deformable than the other.

The buffer device may have any appropriate structure that allows it to contact vertically offset surfaces of an elevator car or counterweight. The buffer device may therefore be formed as any one of a variety of buffer types, each having first and second contact structures.

In some examples, the buffer device may be a resilient material buffer. In some such examples, the first and/or second contact structures may be cylindrical, and the first and second contact surfaces may be formed from the faces of these cylinders. Thus, in some examples, the first contact structure and/or the second contact structure are cylindrical and the first contact surface and/or the second contact surface each comprise an end face of the respective cylinders. The second contact structure may be a hollow cylinder with the first contact structure being located within the hollow.

In some examples, the buffer device may be a hydraulic or oil buffer device, and may comprise a hydraulic ram. This may allow the buffer device to better absorb impacts with an elevator car or counterweight. In such examples, the first and/or second contact structure may comprise a hydraulic ram. In some such examples the buffer device may also comprise one or more resilient members. This may allow the buffer device to better cushion impacts from a descending elevator car or counterweight.

In some examples, the buffer device may be a spring-type buffer device. In such examples, at least one of the first and/or second contact structures comprises a spring arranged to absorb impact. The at least one spring may support the first and/or second contact structures of the buffer device or the springs may themselves form the contact structures and hence the contact surfaces that contact the elevator car or counterweight.

According to a second aspect of this disclosure, there is provided an elevator system comprising: a hoistway; an elevator car and/or counterweight arranged to move within the hoistway; a buffer device as disclosed herein; wherein the elevator car and/or counterweight comprises a first buffer strike surface and a second buffer strike surface; and wherein the first buffer strike surface is arranged to contact the first contact surface of the buffer device, and wherein the second buffer strike surface is arranged to contact the second surface of the buffer device.

The elevator car may comprise a cab mounted within a frame, and the buffer strike surfaces of the elevator car may be formed as part of a buffer strike component of the frame. The buffer strike component may be arranged to strike buffer devices as disclosed herein. Thus, in some examples, the first and/or second buffer strike surfaces form part of a frame of the elevator car. In some examples, the buffer strike component of the frame may comprise a cross-beam and/or a safety plank. The frame typically comprises upright members to the sides of the cab, the uprights being connected together at the top (above the cab) by a header cross-beam and the uprights being connected together at the bottom (under the cab) by a lower cross-beam. The safety plank is typically mounted to the lower cross-beam, underneath the cross-beam and perpendicular to the cross-beam and serves to stiffen the frame of the elevator car, as well as to absorb some of the impact with the buffer device as described below. In some examples, the first buffer strike surface is formed on a cross-beam of the elevator car frame. In some examples, the second buffer strike surface is formed on a safety plank mounted to the cross-beam. In such examples, when a buffer strike event takes place, the impact load is distributed between the two components, i.e. between the cross-beam and the safety plank. Part of the impact force is transferred from the safety plank into the second contact surface (and thus the second contact structure) and part of the impact force is transferred from the cross-beam into the first contact surface (and thus the first contact structure). By distributing the load between the two structures, each structure can accommodate a certain degree of stress and displacement such that the overall stress and displacement is not taken up by a single component. Each component can thus be made smaller and lighter without compromising safety.

In some examples, the buffer device may be located at the bottom of the hoistway, for example in a pit of the elevator hoistway. In such examples, the first buffer strike surface and the second buffer strike surface of the elevator car and/or the counterweight may be arranged to strike the first contact surface and the second contact surface respectively when the elevator car or counterweight is at its lowest position in the hoistway. The impact between the elevator car and/or counterweight and the buffer device may cause the elevator car and/or counterweight to decelerate by absorbing a portion of the impact force of the elevator car and/or counterweight as it approaches the bottom of the hoistway.

In some examples, the buffer device may be attached to the elevator car and/or counterweight. In such examples, the first contact surface of the buffer device may be flush with the first buffer strike surface of the elevator car and/or counterweight, and the second contact surface of the buffer device may be flush with the second buffer strike surface of the elevator car and/or counterweight. In the event that the elevator car and/or counterweight impact the bottom of the elevator hoistway, the buffer device is already in contact with the first and second strike surfaces of the elevator car and/or counterweight, such that the impact causes the elevator car and/or counterweight to decelerate by absorbing a portion of the impact force of the elevator car and/or counterweight.

Although referred to herein as "a buffer strike component", it will be appreciated that the "buffer strike component" may, in some examples, comprise one or more components of the elevator system, such as a cross beam and a safety plank. The buffer strike component may thus comprise a collection of components. Such a collection of buffer strike components may be considered as a buffer strike arrangement. It will similarly be appreciated that the term "buffer strike component" may be used to refer to a single component.

The first and second buffer strike surfaces are vertically offset from one another. Thus, the first and second buffer strike surfaces may be separated by a second distance.

The components on which the first and second buffer strike surfaces are formed may at least partially overlap. Where such an overlap occurs, in order for the first and second contact surfaces of the buffer device to contact the first and second buffer strike surfaces, it may be necessary for an opening to be present in the lower of the first and second buffer strike components. Thus, in some examples, the second buffer strike component comprises an opening, and the opening is larger than the first contact surface of the buffer device. In this way, the first contact structure of the buffer device may pass through the opening, allowing the first contact surface to contact the first buffer strike surface. The first contact structure may therefore contact the first buffer strike surface while the second contact structure contacts the second buffer strike surface.

In order for the contact between the buffer strike surfaces of the elevator car and the contact surfaces of the buffer device to be possible at the same time, the vertical separation between the buffer strike surfaces is preferably equivalent to a vertical separation of the first and second contact surfaces of the buffer device. Thus, in some examples, the second distance is substantially equal to the first distance.

As the buffer device may be compressible, the vertical separation of the first and second contact surfaces of the buffer device need not be exactly equal to the vertical separation of the buffer strike surfaces. Where the vertical separations are not exactly equal, then during a buffer strike event one buffer contact surface will contact the opposing buffer strike surface first. That buffer contact structure will start to compress until the other buffer contact surface contacts the opposing buffer strike surface, There is a limit to how much the buffer device may be compressed, which puts a limit on the difference between the first and second distances. Therefore the first and second distances are preferably within a certain tolerance of each other. Thus, in some examples, the difference between the first distance and the second distance is from 0 mm up to 20 mm or up to 40 mm. For optimal load sharing, ideally the first distance and the second distance are as equal as possible. However, this may not always be possible. The second distance may be greater than the first distance, but in some examples, the first distance is greater than the second distance so that the first buffer contact surface contacts the first buffer strike surface first during a buffer strike event and is followed by contact between the second buffer contact surface and the second buffer strike surface.

It will be appreciated that although the buffer device has been described above in relation to two contact structures and two opposing sets of contact surfaces (buffer contact surfaces and buffer strike surfaces) further buffer contact structures and surfaces may be included, e.g. a third, fourth, etc. buffer contact structure having a third, fourth, etc. buffer contact surface can be arranged to contact a third, fourth, etc. buffer strike surface on the elevator car or counterweight. In such cases, the respective different heights of all buffer contact surfaces may correspond to respective different heights of buffer strike surfaces such that in the event of a buffer strike event, all buffer contact surfaces contact their corresponding buffer strike surfaces substantially simultaneously. In other examples, the different buffer contact surfaces may be arranged to make contact with their corresponding buffer strike surfaces in a predetermined sequence during a buffer strike event so as to gradually bring in more load sharing as the buffer strike event progresses.

The buffer device may be defined in a number of ways and we provide here some alternative ways of viewing and defining the buffer device. It will be appreciated that these relate to the same concept as is set out above and thus the preferred and optional features that have been described above should be considered to be equally applicable to these alternative definitions of the buffer device.

Thus, viewed from another perspective, according to another aspect of this disclosure, there is provided a buffer device for an elevator system, the buffer device comprising: a first contact structure and a second contact structure: wherein the first contact structure comprises a first contact surface; wherein the second contact structure comprises a second contact surface; wherein the second contact surface is vertically offset from the first contact surface by a first distance; wherein the first contact structure and the second contact structure are formed from the same material.

Viewed from another perspective, according to yet another aspect of this disclosure, there is provided a buffer device for an elevator system, the buffer device comprising a first contact structure and a second contact structure; wherein the first contact structure comprises a first contact surface having a first area; wherein the second contact structure comprises a second contact surface having a second area; wherein the second contact surface is vertically offset from the first contact surface by a first distance; wherein the ratio of the first area to the second area is between 0.5 and 1.0.

As above, in some examples, the ratio of the first area to the second area may be between 0.6 and 0.8, for example 0.7.

Viewed from another perspective, according to yet another aspect of this disclosure, there is provided a buffer device for an elevator system, the buffer device comprising: a first contact structure and a second contact structure; wherein the first contact structure comprises a first contact surface; wherein the second contact structure comprises a second contact surface; wherein the second contact surface is vertically offset from the first contact surface by a first distance; wherein the first contact structure has a first height; wherein the second contact structure has a second height; and wherein the difference between the first height and the second height is between 20 mm and 100 mm.

As above, in some examples, the difference between the first height and the second height may be between 40 mm and 70 mm. In some examples, the difference between the first height and the second height may be between 45 mm and 55 mm, for example about 50 mm.

Features of any aspect or example described herein may, wherever appropriate, be applied to any other aspect or example described herein. In particular, it will be appreciated that all of the different aspects set out above may describe the same embodiments and therefore any preferred or optional features set out above in relation to one aspect should be considered also to be preferred or optional features of the other aspects. Where reference is made to different examples or sets of examples, it should be understood that these are not necessarily distinct but may overlap.

BRIEF DESCRIPTION OF THE DRAWINGS

Certain preferred examples of this disclosure will now be described, by way of example only, with reference to the accompanying drawings, in which.

DETAILED DESCRIPTION

Figure 1:
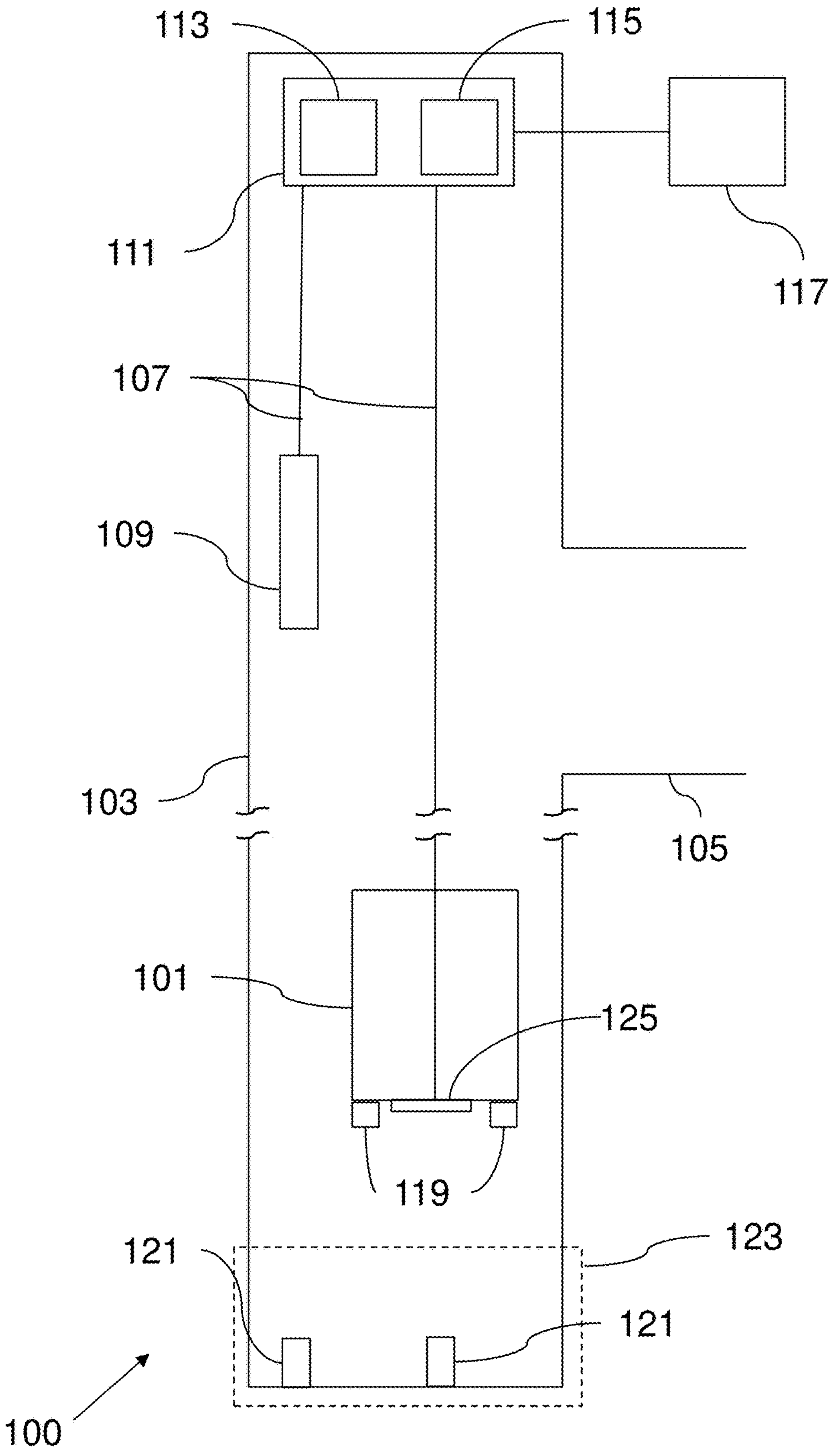
FIG. 1 is a schematic view of an elevator system employing a buffer device according to an example of the present disclosure.

FIG. 1 illustrates an elevator system 100 comprising an elevator car 101 that runs in a hoistway 103 between various landings 105 of a building. Although a single landing 105 is shown for illustrative purposes, it will be appreciated that more landings are present within the building but are not shown in FIG. 1 for simplicity.

The elevator car 101 is suspended in the hoistway 103 by the first end of a tension member 107 (e.g. one or more ropes or belts). The second end of the tension member 107 is connected to a counterweight 109. The elevator car 101 and the counterweight 109 are moving components in the elevator system 100. Although the elevator car 101 and the counterweight 109 shown in FIG. 1 are connected by a tension member 107, it will be appreciated that in other examples the elevator system may be ropeless, e.g. using linear motors or other propulsion systems.

During normal operation, the elevator car 101 travels up and down in the hoistway 103 to transport passengers and/or cargo between landings 105 of the building. The elevator car 101 is driven by a drive system 111 comprising a drive motor 113 and a motor brake 115. The tension member 107 passes over a drive sheave (not shown) that is driven to rotate by the drive motor 113 and is braked by the motor brake 115. Operation of the drive system 111 is controlled by an elevator controller 117, which is in signal communication with the drive system 111. In addition to the motor brake 115, the elevator system includes elevator car safety brakes 119, arranged to arrest motion of the elevator car 101 in the event that an emergency stopping operation is required. Such safety brakes 119 typically stop the car 101 by frictionally engaging with guiderails in the hoistway 103, although it will be appreciated that any suitable safety brake 119 may be employed.

The elevator system 100 also includes a buffer group comprising two buffer devices 121 located in a pit 123 of the hoistway 103. The buffer devices 121 project upwards from the floor of the pit 123. The buffer devices 121 are arranged such that the elevator car 101 or counterweight 109 will strike them in the event that either component descends too far within the hoistway 103 in order to decelerate the elevator car 101 or the counterweight 109. In the following, an interaction between the buffer device 121 and the elevator car 101 is described, however it will be appreciated that the description is equally applicable to the counterweight 109. Although the buffer group shown in FIG. 1 comprises one buffer device 121 for the elevator car 101 and one buffer device 121 for the counterweight 109, it will be appreciated that the buffer group may comprise more or fewer buffer devices 121 as appropriate for the elevator system in which it is used. For example, there may two or more buffer devices 121 for the elevator car 101, and a further buffer device 121 for the counterweight 109.

The buffer device 121 is arranged to strike a buffer strike component 125 of the elevator car 101 in the event that the elevator car 101 descends too far within the hoistway 103. The impact between the buffer strike component 125 and the buffer device 121 serves to decelerate the elevator car 101, ultimately arresting its motion. This may be required, for example, if the motor brake 115 and safety brakes 119 fail to completely arrest the motion of the elevator car 101 as it descends within the hoistway 103.

Figures 2A, 2B:
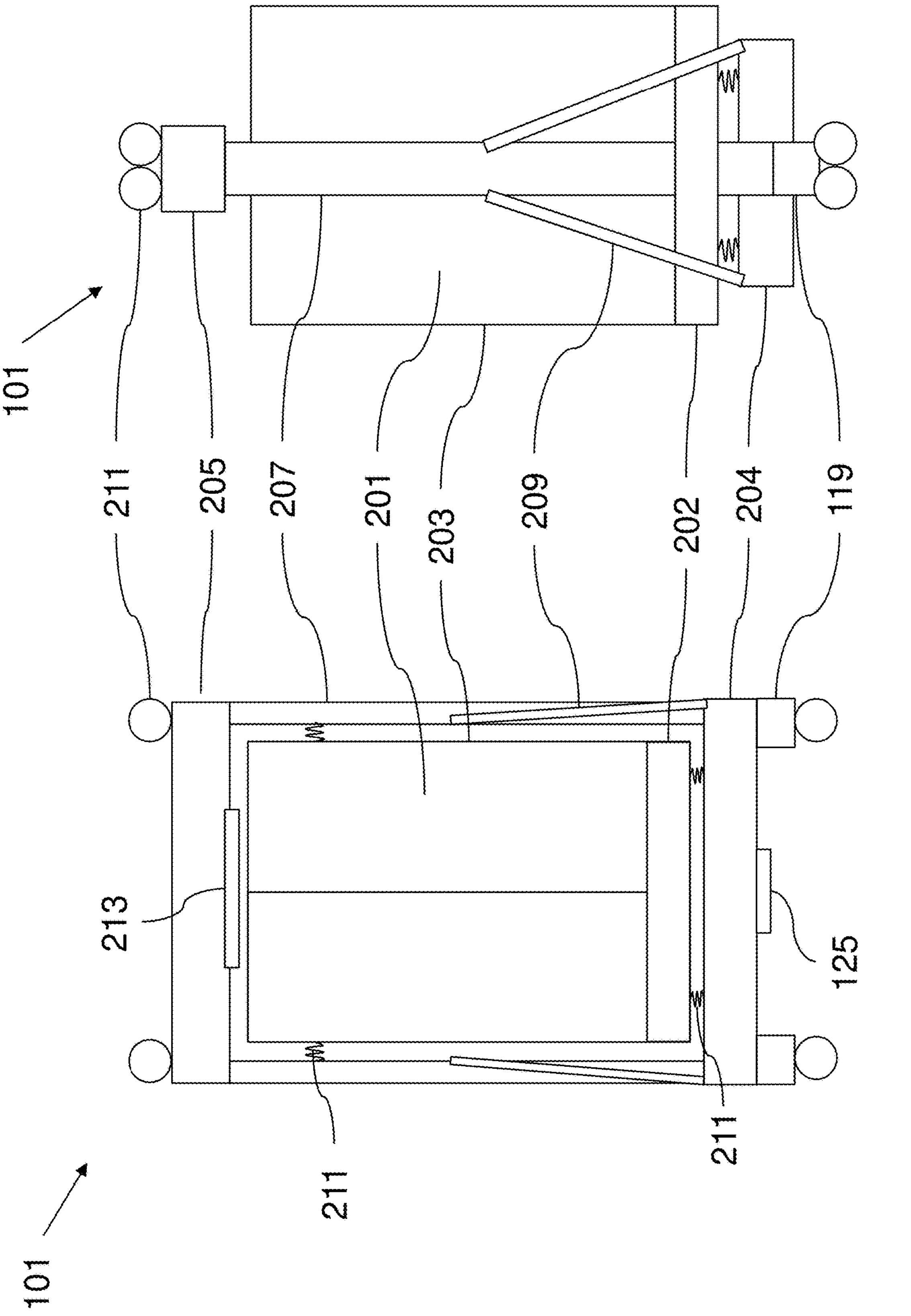
FIGS. 2A and 2B are schematic diagrams showing an elevator car of an elevator system according to an example of the present disclosure.

FIGS. 2A and 2B show a front and side view respectively of the elevator car 101 according to an example of the present disclosure. The elevator car 101 can be seen to comprise a cab 201, comprising a platform 202 and a passenger cabin 203, mounted within a frame. The frame consists of a sub-frame 204 located beneath the cab 201 (the sub-frame 204 comprising a lower cross-beam as discussed further below), a crosshead (or header cross-beam) 205 located above the cab 201, and uprights 207 on either side of the cab 201, supported by side braces 209. The cab 201 is mechanically isolated from the frame by a plurality of isolating components 211 to provide vibration and noise isolation for the cab 201 in order to improve passenger comfort. According to the example shown in FIGS. 2A and 2B, the elevator car 101 is arranged to move along guide rails (not shown in FIG. 1 for simplicity) mounted within the hoistway 103, using guides 211 mounted above and below the frame of the elevator car 101.

As will be described in more detail below with reference to FIGS. 3A and 3B, the elevator car 101 also comprises a buffer strike component 125, located below the elevator car 101 and arranged to strike the buffer device 121 projecting from the floor of the pit 123 of the elevator hoistway 103. The buffer strike component 125 extends horizontally in a region below the elevator car 101, and in the example shown in FIG. 2A, is formed as part of the sub-frame 204 of the elevator car 101.

Figure 3A:
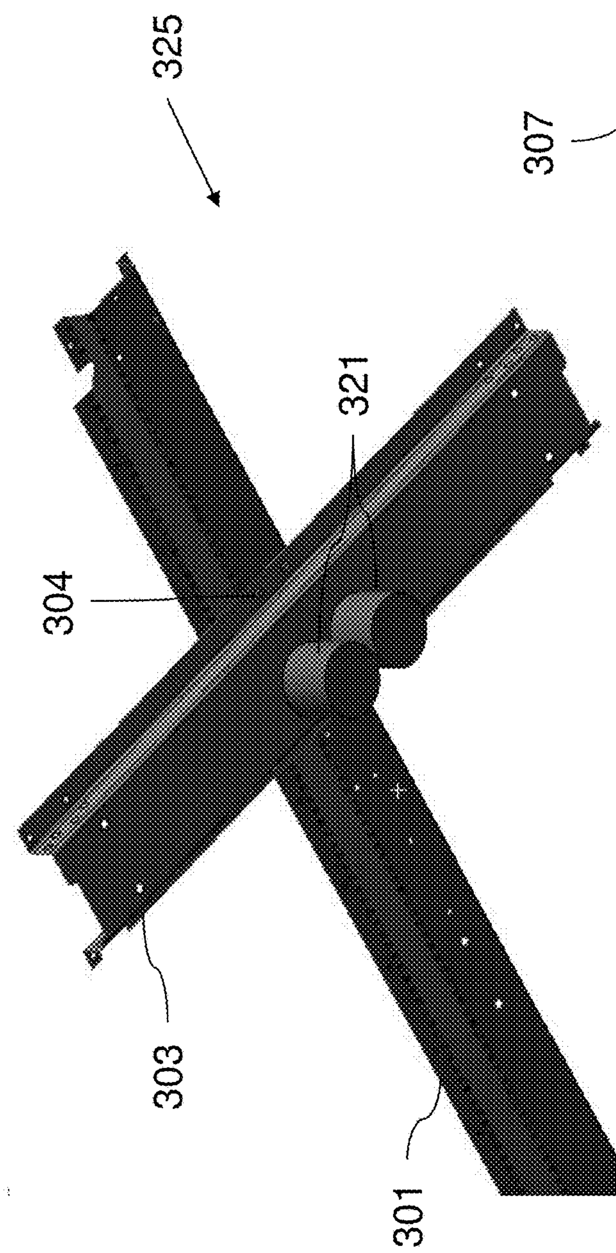
FIG. 3A PRIOR ART
FIGS. 3A and 3B show the interaction between a buffer device and an elevator safety plank according to the prior art.
Figure 3B:
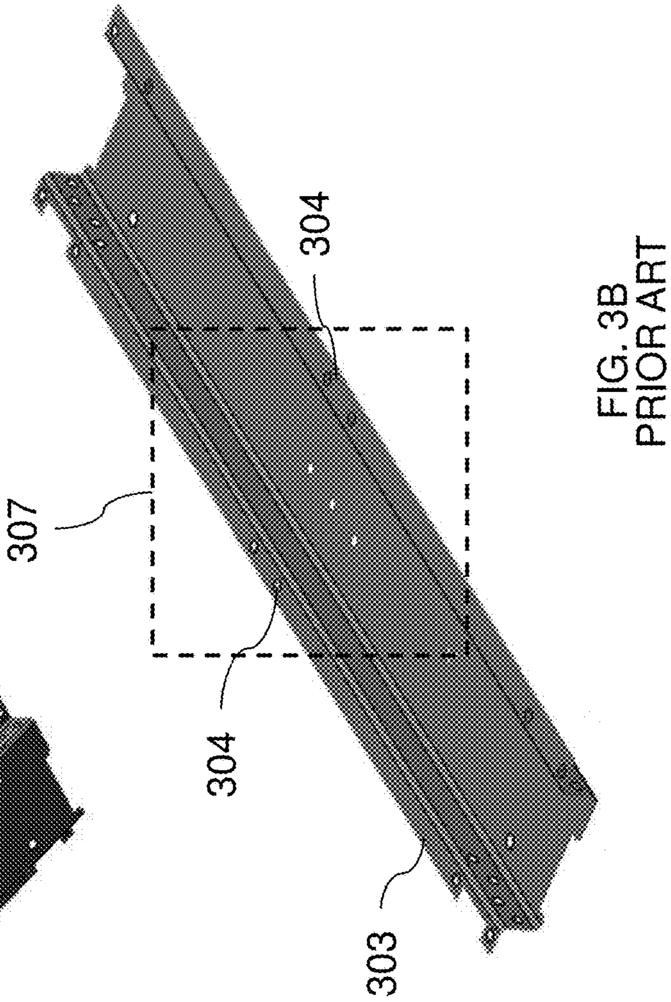
FIG. 3B PRIOR ART

An example of a buffer strike component 325 according to the prior art is shown in FIGS. 3A and 3B. FIG. 3A shows a cross-beam 301, formed as part of the sub-frame 204 of an elevator car 101, which extends between the uprights 207 of the frame of the elevator car 101. A safety plank 303, arranged to contact a pair of cylindrical resilient member buffer devices 321, is mounted to the cross-beam 303 by a plurality of rivets 304 and extends in a direction substantially perpendicular to the cross-beam 301. Therefore in the prior art, the safety plank 303 forms the buffer strike component 325 arranged to strike the pair of resilient member buffer devices 321 located at the bottom of an elevator hoistway 103. The term "buffer strike component" may thus be construed here as referring to the safety plank 303 only, i.e. the component arranged to strike the buffer device 321. The buffer devices 321 are formed from a compressible material, such as a deformable polymer, e.g., polyurethane, and are arranged to strike a substantially flat surface of the safety plank 303, illustrated as region 307 in FIG. 3B.

Conventionally, multiple buffer devices 321 are required (as shown in FIG. 3A) in order to distribute stress across the safety plank 303 that arises as a result of impact between the safety plank 303 and the buffer devices 321. However, with the improved buffer device and buffer strike design according to examples of this disclosure, stress can be better distributed in a buffer strike event, such that a single buffer device is sufficient, as will be explained in the following.

Figure 4A:
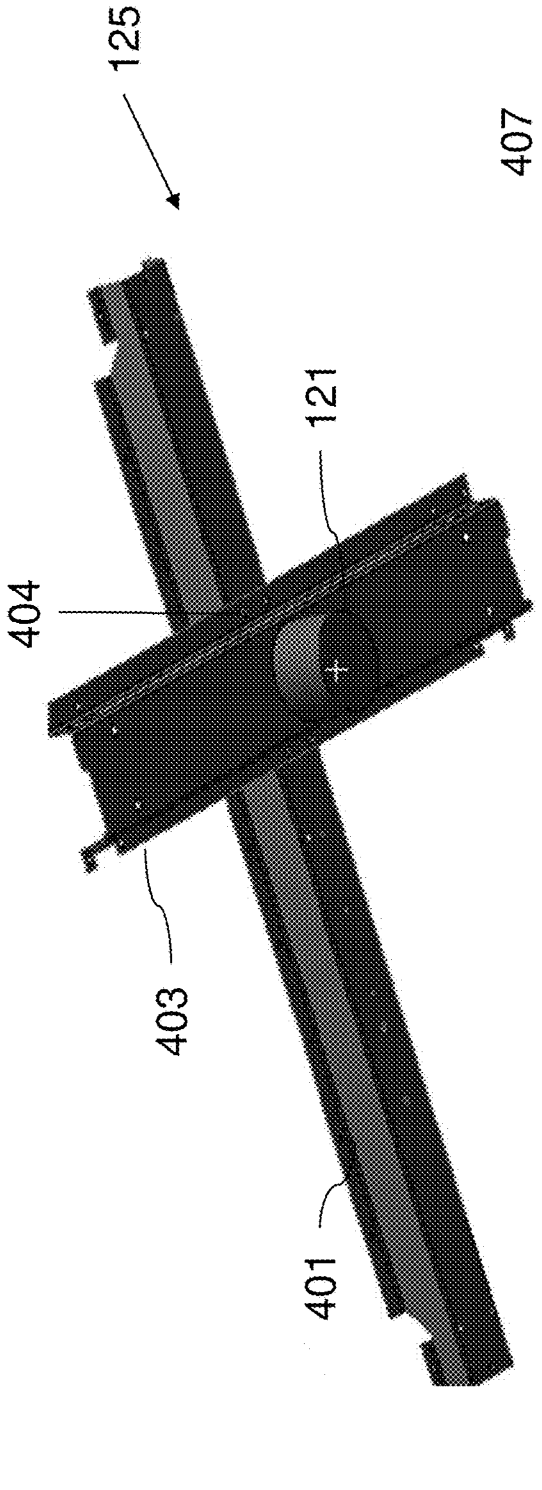
FIGS. 4A and 4B show the interaction between a buffer device and an elevator safety plank and cross-beam according to an example of the present disclosure.
Figure 4B:
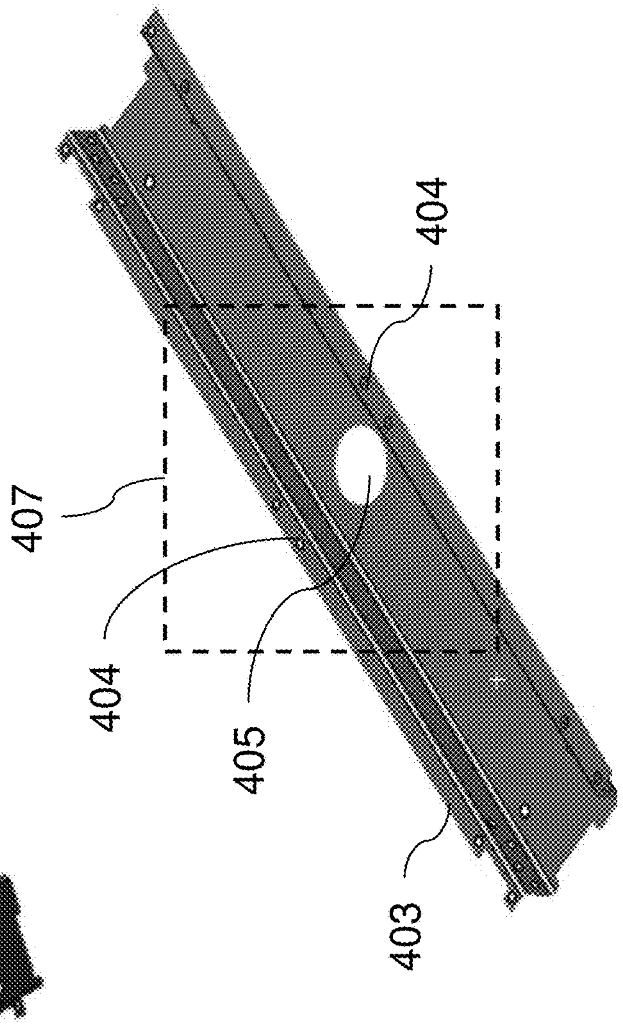

FIGS. 4A and 4B show a buffer strike component 125 according to an example of the present disclosure. As can be seen in FIG. 4A, the buffer strike component 125 includes both the safety plank 403 and a cross-beam 401, formed as part of the sub-frame 204 of the elevator car 101, which extends between the uprights 207 of the elevator car 101 shown in FIG. 2A. The safety plank 403 is mounted to the cross-beam 401 by a plurality of rivets 404 and extends in a direction substantially perpendicular to the cross-beam 401. The term "buffer strike component" is thus used in this example to refer to the combination of the safety plank 403 and the cross-beam 401, i.e. referring to both of the components arranged to strike the buffer device 121.

In contrast to the prior art safety plank 303 shown in FIGS. 3A and 3B, a hole 405 is formed in the safety plank 403 as shown in FIG. 4B, The hole 405 is generally located in the centre of the safety plank 403, and is arranged to accommodate part of the buffer device 121 according to an example of the present disclosure. The buffer strike component 125 is designed to operate with a single buffer device 121, configured such that part of the buffer device 121 can pass through the safety plank 403 (through the hole 405) to strike the cross-beam 401. The buffer device 121 is therefore shaped such that at least part of it is able to pass through the safety plank 403 (through the hole 405), allowing the buffer device 121 to simultaneously contact both the safety plank 403 and the cross-beam 401 in the event of an impact between the elevator car 101 and the buffer device 121. The buffer strike component 125 of the present disclosure therefore comprises both a region of the safety plank 403, and a region of the cross-beam 401, which are arranged to strike a buffer device 121 according to an example of the present disclosure, located in the pit 123 of the hoistway 103.

In prior art buffer strike systems, only the safety plank 303 is directly contacted by the buffer devices 321 located in the elevator hoistway 103, and the cross-beam 301 only receives force through the rivets through which it is mounted to the safety plank 303. In contrast, the buffer device 121 of the present disclosure is able to share the force of an impact directly between the safety plank 403 and the cross-beam 401 to better distribute stress between the two components.

This arrangement allows the system of the present disclosure to meet required safety standards relating to the maximum stresses experienced by the safety plank 403 while implementing a single buffer device 121. It also has the advantages of reducing the weight and cost of the safety plank 403, both through the presence of the central hole 405, but also by allowing thinner sheet metal to be used as a result of safety plank 405 being subjected to lower stress, reducing the risk of deformation.

According to an example of the present disclosure, the buffer device 121 comprises distinct upper and lower regions, arranged to contact the cross-beam 401 and the safety plank 403 respectively, where the upper region is arranged to pass through the hole 405 in the safety plank 403. An example of the buffer device 121 is shown in FIG. 5A. The buffer device 121 comprises a first contact structure 501 in an upper region of the buffer device 121, and a second contact structure 503 in a lower region of the buffer device. The first contact structure 501 comprises a first contact surface 505, arranged to contact the cross-beam 401 of the elevator car 101 when the upper region of the buffer device 121 passes through the hole 405 in the safety plank 403. The second contact structure 503 comprises a second contact surface 507 arranged to contact the safety plank 403 of the elevator car 101 in the area surrounding the hole 405. The buffer device 121 may be formed from the same deformable polymer (e.g. polyurethane) as prior art buffer devices such as the buffer devices 321 shown in FIGS. 3A and 3B.

Figure 5B:
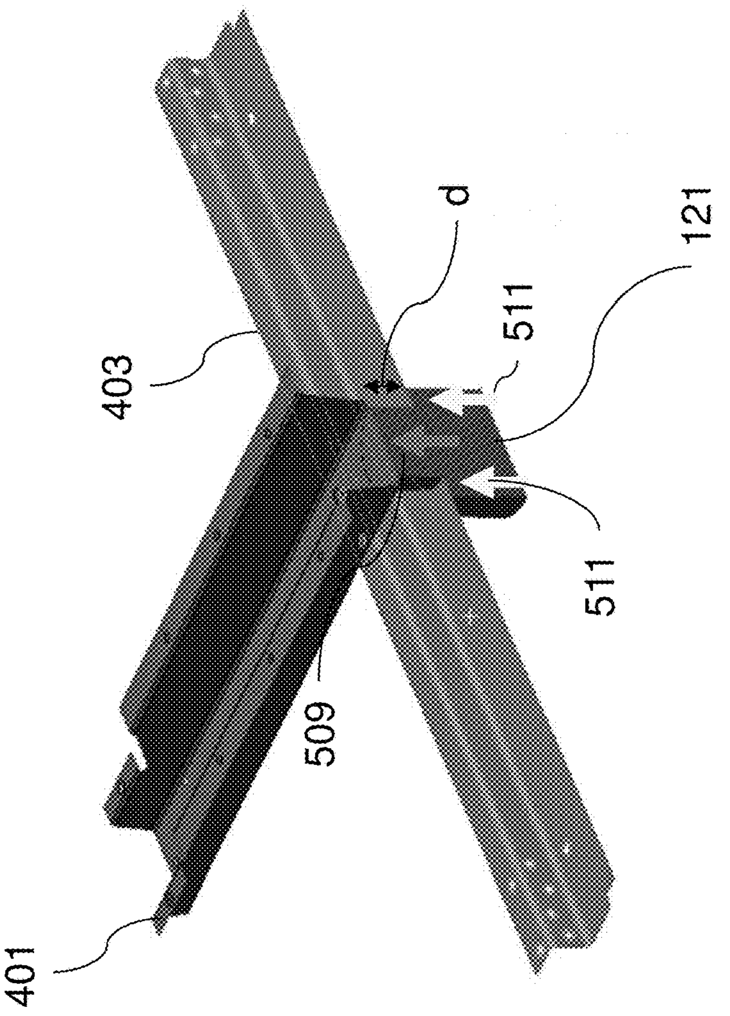
FIGS. 5A and 5B show an elevator buffer device according to an example of the present disclosure.
Figure 5A:
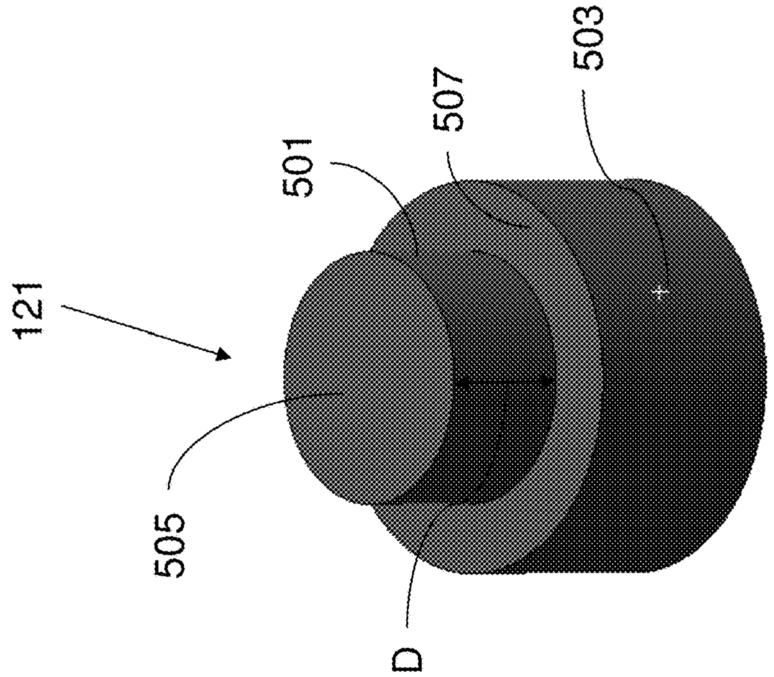

FIG. 5B shows the buffer device 121 in contact with the safety plank 403 and the cross-beam 401, as would occur in the event of an impact between the buffer strike component 125 and the buffer device 121 in the event that the elevator car 101 descends too far within the hoistway 103. It can be seen in FIG. 5B that the first contact surface 505 is in contact with the cross-beam 401 (as indicated by the arrow 509) in the area behind the hole 405, while the second contact surface is in contact with the safety plank 403 (as indicated by the arrows 511) in the area around the periphery of the hole 405. The vertically offset cross-beam 401 and safety plank 403 therefore form first and second buffer strike surfaces arranged to contact the first contact surface 505 and the second contact surface 507 of the buffer device 121 respectively.

To enable contact with the first and second contact surfaces 505, 507, the difference in height, D, between the first contact surface 505 and the second contact surface 507 is preferably selected such that it is substantially equivalent to the vertical offset, d, between the contact regions of the safety plank 403 and the cross-beam 401. However, while in the example shown in FIG. 5B, the difference in height between the first contact surface 505 and the second contact surface 507 is equal to this vertical offset, it will be appreciated that the two values need not be exactly equal. Instead, there is some tolerance in these values within which contact between the buffer device 121 and both of the safety plank 403 and cross-beam 401 can be achieved despite such a height difference. For example, as the buffer device 121 is deformable (and some amount of deflection of the cross-beam 403 may occur), the first contact structure may extend above the second contact structure by a distance slightly greater than the vertical offset between the cross-beam 401 and the safety plank 403, while still allowing contact with both the cross-beam 401 and the safety plank 403 following some deformation of the buffer device 121 and/or cross beam 401. In other examples, the first contact structure may extend above the second contact structure by a distance slightly less than the vertical offset between the cross-beam 401 and the safety plank 403, while still allowing contact with both the cross-beam 401 and the safety plank 403 following some deformation of the buffer device 121 and/or the safety plank 403. However, it is nonetheless preferable that the difference in height D between the first contact surface 505 and the second contact surface 507 is substantially equivalent to the vertical offset d between the contact regions of the safety plank 403 and the cross-beam 401 to ensure contact is simultaneous.

While in the example shown in FIG. 5A, the buffer device 121 can be seen to have the form of two stacked cylinders having different diameters, it will be appreciated that alternative designs may achieve the same beneficial effects, as long as respective buffer strike surfaces of the elevator car 101 (i.e. the safety plank 403 and the cross-beam 401 in the examples described above) are impacted at substantially the same time by the buffer device 121. It will be further appreciated that alternative buffer designs will require that the shape of the hole 405 formed in the safety plank 403 be modified accordingly, such that a portion of such an alternative buffer device is able to protrude through the hole and contact the cross-beam 401.

The first contact surface 505 and the second contact surface 507 have approximately equal areas (although the first contact surface 505 may be slightly larger than the second contact surface 507, with a ratio of about 0.6-0.7), the relative area sizes determining the load distribution between the cross-beam 401 and the safety plank 403 during a buffer strike event.

It will be appreciated that in other examples the buffer device 121 could be shaped so as to contact the cross-beam 401 and the safety plank 403 with contact surfaces that are arranged side by side. In such examples, a hole 405 through the safety plank 403 may not be necessary. However, embodiments including the hole 405 have been found to allow a buffer device 121 having a compact and effective shape to be used. In particular, although a hole 405 is provided in the safety plank 403, the safety plank 403 shares the load with the cross-beam 401 and therefore experiences overall lower stresses and deformations.

Although the buffer device 121 is shown as being a resilient material buffer in FIGS. 4A-5B, it is contemplated that other buffer types, such as spring-type, hydraulic, or oil-type buffers could be employed in accordance with the present disclosure, while still achieving the same beneficial effects described above. Examples of such alternative buffer designs are shown in FIGS. 6A-6C.

Figures 6A, 6B, 6C:
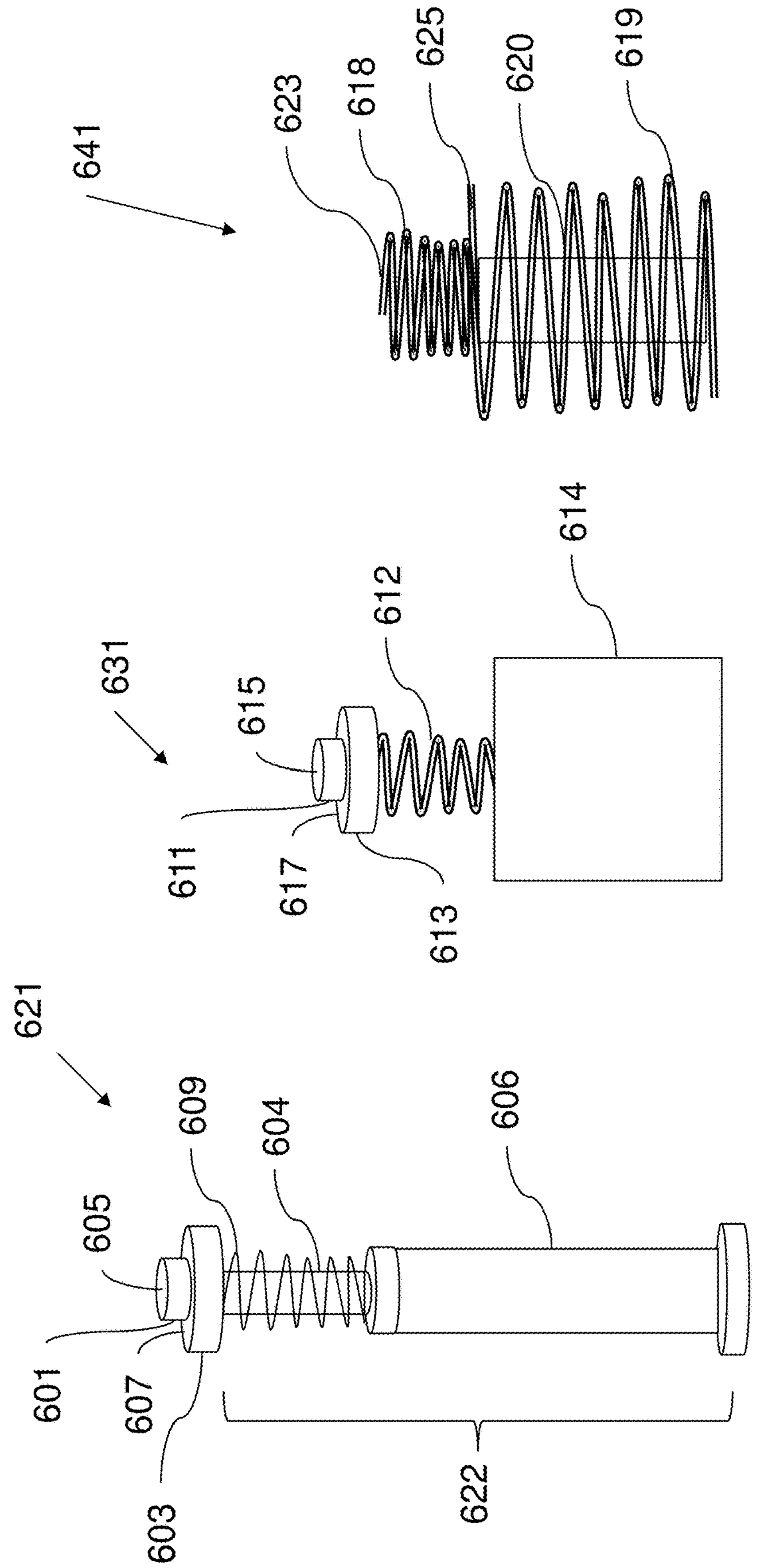
FIGS. 6A-6C are schematic diagrams showing elevator buffer devices according to further examples of the present disclosure.

FIG. 6A shows a hydraulic-type buffer device 621 according to an example of the present disclosure. The buffer device 621 comprises an upper first contact structure 601, and a lower second contact structure 603, formed as part of a hydraulic ram 622. The first contact structure 601 comprises a first contact surface 605, arranged to contact the cross-beam 401 of the elevator car 101 when the first contact structure of the buffer device 621 passes through the hole 405 in the safety plank 403. The second contact structure 603 comprises a second contact surface 607, arranged to contact the safety plank 403 of the elevator car 101 in the area surrounding the hole 405. The hydraulic ram 622 on which the first contact structure 601 and second contact structure 603 are mounted comprises a piston 604 extending within a partially fluid-filled cylinder 606. The fluid may be oil, water, or any fluid capable of providing hydraulic damping as is known in the art. In the event of impact with the elevator car 101 at the first and second contact surfaces 601, 603, the piston 604 is pushed into the fluid-filled cylinder 606, displacing fluid and dissipating energy of the impact and decelerating the elevator car 101 as is known in the art. The buffer device 621 also comprises a spring 609 to provide additional cushioning of impact with the elevator car 101.

FIG. 6B shows a resilient member type (or spring type) buffer device 631 according to an example of the present disclosure. The buffer device 631 comprises an upper first contact structure 611, and a lower second contact structure 613. The first contact structure 611 comprises a first contact surface 615, arranged to contact the cross-beam 401 of the elevator car 101 when the first contact structure 611 of the buffer device 631 passes through the hole 405 in the safety plank 403. The second contact structure 613 comprises a second contact surface 617, arranged to contact the safety plank 403 of the elevator car 101 in the area surrounding the hole 405. The first contact surface 611 and the second contact surface 613 are arranged to strike the cross-beam 401 and the safety plank 403 respectively at substantially the same time. The first contact structure 611 and the second contact structure 613 are mounted on a resilient member 612, which is fixed to a mount 614. The resilient member 612 is arranged to be compressed upon impact of the first contact surface 611 and the second contact surface 613 with the elevator car 101, absorbing a portion of the impact force.

FIG. 6C shows a second resilient member type (or spring type) buffer device 641 according to an example of the present disclosure. The buffer device 641 comprises a first resilient member 618 and a second resilient member 619. The first resilient member 618 forms a first contact structure, and the second resilient member forms a second contact structure. The second resilient member 619 substantially surrounds the first resilient member 618, and in the example shown the two components are coaxial. The first resilient member 618 is fixed to a mount 620, such that it is located above the second resilient member 619. It will be appreciated however that the mount 620 could be removed and the size of the first resilient member 618 increased accordingly.

The first resilient member comprises a first contact surface 623, arranged to contact the cross-beam 401 of the elevator car 101 when the first contact resilient member 618 of the buffer device 641 passes through the hole 405 in the safety plank 403. The second resilient member 619 comprises a second contact surface 625, arranged to contact the safety plank 403 of the elevator car 101 in the area surrounding the hole 405. The first contact surface 623 and the second contact surface 625 are arranged to strike the cross-beam 401 and the safety plank 403 respectively at substantially the same time, and to compress in response to such an impact to absorb some of the energy of the impact, decelerating the elevator car 101.

The use of a buffer strike component 125 and buffer device 121 as described herein, i.e. which serves to distribute the impact force between both the cross-beam 401 and the safety plank 403, has been found to result in improved performance in comparison to prior art buffer devices which only contact the safety plank 403, such as the buffer devices 321 shown in FIGS. 3A and 3B. In particular, following impact with the buffer device 121 according to the present disclosure, the maximum stress introduced in the safety plank 403 is seen to be reduced in comparison to the stress introduced in the prior art safety plank 303 following impact with the prior art buffer devices 321. The maximum deformation of the safety plank 403 following impact with the buffer device 121 has also been found to be reduced in comparison to that seen in the prior art safety plank 303 following impact with the buffer devices 321. As the stresses introduced in, and deformation of, the safety plank 403 are reduced, the safety plank 403 may be formed using thinner and lighter material than in prior art implementations. This may allow manufacturing costs of the safety plank 403 to be reduced.

It will be appreciated by those skilled in the art that the disclosure has been illustrated by describing one or more specific aspects thereof, but is not limited to these aspects; many variations and modifications are possible, within the scope of the accompanying claims.

What is claimed is:

1. An elevator system comprising:
a hoistway (103);
an elevator car (101) and/or a counterweight (109) arranged to move within the hoistway (103);
a buffer device (121) including:
a first contact structure (501) and a second contact structure (503);
wherein the first contact structure (501) comprises a first contact surface (505);
wherein the second contact structure (503) comprises a second contact surface (507);
wherein the first contact surface (505) and the second contact surface (507) are arranged for contacting respective vertically offset surfaces of an elevator car (101) or counterweight (109);
wherein the buffer device (121) is positioned at a bottom of the hoistway beneath the elevator car (101) and/or the counterweight (109);
wherein the elevator car (101) and/or counterweight (109) comprises a first buffer strike surface (401) and a second buffer strike surface (403);
wherein the first buffer strike surface (401) is arranged to contact the first contact surface (505) of the buffer device (121), and wherein the second buffer strike surface (403) is arranged to contact the second contact surface (507) of the buffer device (121);
wherein the first contact structure (501) has a first contact area (505); wherein the second contact structure (503) has a second contact area (507); and wherein the ratio of the first contact area (505) to the second contact area (507) is between 0.5 and 1.0.

2. An elevator system comprising:
a hoistway (103);
an elevator car (101) and/or a counterweight (109) arranged to move within the hoistway (103);
a buffer device (121) including:
a first contact structure (501) and a second contact structure (503);
wherein the first contact structure (501) comprises a first contact surface (505);
wherein the second contact structure (503) comprises a second contact surface (507);
wherein the first contact surface (505) and the second contact surface (507) are arranged for contacting respective vertically offset surfaces of an elevator car (101) or counterweight (109);
wherein the buffer device (121) is positioned at a bottom of the hoistway beneath the elevator car (101) and/or the counterweight (109);
wherein the elevator car (101) and/or counterweight (109) comprises a first buffer strike surface (401) and a second buffer strike surface (403);
wherein the first buffer strike surface (401) is arranged to contact the first contact surface (505) of the buffer device (121), and wherein the second buffer strike surface (403) is arranged to contact the second contact surface (507) of the buffer device (121);
wherein the first contact structure (501) and the second contact structure (503) are formed from the same material.

3. An elevator system comprising:
a hoistway (103);
an elevator car (101) and/or a counterweight (109) arranged to move within the hoistway (103);
a buffer device (121) including:
a first contact structure (501) and a second contact structure (503);
wherein the first contact structure (501) comprises a first contact surface (505);
wherein the second contact structure (503) comprises a second contact surface (507);
wherein the first contact surface (505) and the second contact surface (507) are arranged for contacting respective vertically offset surfaces of an elevator car (101) or counterweight (109);
wherein the buffer device (121) is positioned at a bottom of the hoistway beneath the elevator car (101) and/or the counterweight (109);
wherein the elevator car (101) and/or counterweight (109) comprises a first buffer strike surface (401) and a second buffer strike surface (403);
wherein the first buffer strike surface (401) is arranged to contact the first contact surface (505) of the buffer device (121), and wherein the second buffer strike surface (403) is arranged to contact the second contact surface (507) of the buffer device (121);
wherein the first buffer strike surface (401) comprises a cross-beam of the frame and the second buffer strike surface (403) comprises a safety plank of the frame.

4. An elevator system comprising:
a hoistway (103);
an elevator car (101) and/or a counterweight (109) arranged to move within the hoistway (103);

a buffer device (121) including:

a first contact structure (501) and a second contact structure (503);

wherein the first contact structure (501) comprises a first contact surface (505);

wherein the second contact structure (503) comprises a second contact surface (507);

wherein the first contact surface (505) and the second contact surface (507) are arranged for contacting respective vertically offset surfaces of an elevator car (101) or counterweight (109);

wherein the buffer device (121) is positioned at a bottom of the hoistway beneath the elevator car (101) and/or the counterweight (109);

wherein the elevator car (101) and/or counterweight (109) comprises a first buffer strike surface (401) and a second buffer strike surface (403);

wherein the first buffer strike surface (401) is arranged to contact the first contact surface (505) of the buffer device (121), and wherein the second buffer strike surface (403) is arranged to contact the second contact surface (507) of the buffer device (121);

wherein the second buffer strike surface (403) comprises an hole (405), wherein the hole (405) is larger than the first contact surface (505) of the buffer device (121), the first contact surface (505) positioned to pass through the hole (405) and contact the first buffer strike surface (403).

5. The elevator system of claim 4, wherein the second contact surface (507) is vertically offset from the first contact surface (505) by a first distance.

6. The elevator system of claim 4, wherein the first contact structure (501) and/or the second contact structure (503) are elastically deformable.

7. The elevator system of claim 4, wherein the second contact surface (507) is substantially parallel to the first contact surface (505).

8. The elevator system of claim 4, wherein the second contact surface (507) substantially surrounds the first contact surface (505), wherein optionally the second contact surface (507) and the first contact surface (505) are concentric.

9. The elevator system of claim 4, wherein the first contact structure (501) is formed from a first material, and wherein the second contact structure (503) is formed from a second material.

10. The elevator system of claim 9, wherein the first contact structure (501) and/or the second contact structure (503) are cylindrical and wherein the first contact surface (505) and/or the second contact surface (507) comprise an end face of the cylinders.

11. The elevator system of claim 4, wherein the buffer device (121) is a spring-type buffer, and wherein the first and/or second contact structure (503) comprises one or more resilient members.

12. The elevator system of claim 4, wherein the buffer device (121) is a hydraulic or oil buffer, and wherein the first and/or second contact structure (503) comprises a hydraulic ram.

13. The elevator system of claim 4, wherein the first buffer strike surface (401) and/or the second buffer strike surface (403) forms part of a frame of the elevator car (101.

14. The elevator system of claim 4, wherein the first buffer strike surface (403) and the second buffer strike surface (405) are separated by a second distance, and wherein the second distance is equal to the first distance.

* * * * *